United States Patent [19]

Oikawa et al.

[11] Patent Number: 4,952,037
[45] Date of Patent: Aug. 28, 1990

[54] PLATE MICROLENS AND METHOD FOR MANUFACTURING THE SAME

[75] Inventors: Masahiro Oikawa, Ibaragi; Tetsuya Yamasaki, Sakura; Kouji Tanaka, Ibaragi; Eiji Okuda, Sakura, all of Japan

[73] Assignee: Nippon Sheet Glass Co., Ltd., Osaka, Japan

[21] Appl. No.: 317,079

[22] Filed: Feb. 28, 1989

Related U.S. Application Data

[63] Continuation of Ser. No. 119,249, Nov. 2, 1987, abandoned, which is a continuation of Ser. No. 836,339, Mar. 5, 1986, abandoned.

[30] Foreign Application Priority Data

Mar. 5, 1985 [JP] Japan .................................. 60-43530
Jun. 10, 1985 [JP] Japan .................................. 60-125896

[51] Int. Cl.$^5$ ........................... G02B 3/00; G02B 1/00
[52] U.S. Cl. .................................. 350/413; 65/30.13; 350/417
[58] Field of Search ................. 65/30.13, 37, 3.14; 350/413, 416, 417, 167; 427/163, 166

[56] References Cited

U.S. PATENT DOCUMENTS

| | | | |
|---|---|---|---|
| 4,076,384 | 2/1978 | Deml et al. ........................ | 264/2.5 |
| 4,231,775 | 11/1980 | Siegmund ........................ | 65/30.13 |
| 4,246,016 | 1/1981 | Siegmund ........................ | 65/30.13 |
| 4,293,188 | 10/1981 | McMahon ........................ | 350/96.29 |
| 4,296,143 | 10/1981 | Franken ........................ | 350/417 |
| 4,380,365 | 4/1983 | Gross ........................ | 350/96.18 |
| 4,457,590 | 7/1984 | Moore ........................ | 350/413 |
| 4,472,030 | 9/1984 | Tachibana ........................ | 65/30.13 |
| 4,509,824 | 4/1985 | Yamasaki ........................ | 350/413 |
| 4,531,810 | 7/1985 | Carlson ........................ | 350/96.20 |

FOREIGN PATENT DOCUMENTS

| | | | |
|---|---|---|---|
| 214838 | 10/1984 | Fed. Rep. of Germany .......... | 65/37 |
| 3329571 | 2/1985 | Fed. Rep. of Germany .......... | 65/37 |
| 58-167438 | 10/1983 | Japan ................................. | 65/30.13 |
| 59-140401 | 8/1984 | Japan ................................. | 65/30.13 |
| 1417806 | 12/1975 | United Kingdom . | |

*Primary Examiner*—Kenneth M. Schor
*Attorney, Agent, or Firm*—Herbert Dubno

[57] ABSTRACT

In a plate microlens of the invention wherein gradient index lenses each having an optical axis along a normal to a surface of a transparent base and a refractive index profile gradually changing along a direction of the optical axis and a direction perpendicular thereto are formed integrally in the transparent base, a ratio d/a (where d is a thickness of the gradient index lens on the optical axis and 2a is a diameter of the gradient index lens on a surface of the transparent base) falls within a range of 0.46 to 0.78. In a method for manufacturing a plate microlens of the invention of forming integrally in a transparent base gradient index lenses with a gradient index profile based on a concentration gradient of a substance for increasing the refractive index of the transparent base, by forming a diffusion preventive mask with predetermined apertures on a surface of the transparent base and diffusing the substance into the transparent base through the apertures, a ratio a/rm (where rm is a radius of the apertures and a is a radius of the gradient index lenses to be formed) satisfies a relation $1.75 \leq a/rm \leq 4.5$.

1 Claim, 7 Drawing Sheets

PLATE MICROLENS AND METHOD FOR MANUFACTURING THE SAME This is a continuation of co-pending application Ser. No. 119,249 filed on Nov. 2, 1987, which is a continuation of Ser. No. 836,339 filed Mar. 5, 1986, both of which are now abandoned.

FIELD OF THE INVENTION

The present invention relates to a plate microlens wherein a gradient index lens is formed integrally within a transparent base.

BACKGROUND OF THE INVENTION

As shown in FIG. 1, in a plate microlens 1, gradient index lenses 3 are buried integrally in a flat transparent base or substrate 2 of glass or plastic. One refractive surface of each lens 3 is a flat surface coinciding with the surface of the base 2. Each lens 3 has an optical axis along a normal to the surface of the base 2. The refractive index of each lens 3 along its optical axis is maximum at the surface and gradually decreases with an increase in depth. The refractive index of each lens 3 in a direction perpendicular to the optical axis is also maximum at the center and gradually decreases toward the periphery.

The shape (as viewed from the top) of each lens 3 is circular as shown in FIG. 2 or linear as shown in FIG. 3.

A typical method for manufacturing a plate microlens 1 as described above will be described below. As shown in FIG. 4, the surface of a glass base 2 is covered with an ion-permeation preventive mask 5 such as a metal thin film. Small apertures 6 of, e.g., circular shape corresponding to the shape of desired lenses 3 are formed in the mask 5. The surface of the base 2 having the mask 5 thereon is dipped in a molten salt 7 containing cations such as Tl ions which increase the refractive index of the base glass. Then, the cations in the molten salt 7 diffuse into the base 2 through the apertures 6 in the mask 5. After ion diffusion is performed in this manner for a predetermined period of time, an ion concentration profile is obtained below each aperture 6 in the base 2, wherein the ion concentration is maximum near the aperture 6 and decreases toward deeper and peripheral portions of the prospective lenses 3. Thus, portions having the gradient refractive index as described above, i.e., lenses 3 are formed.

In such a conventional plate microlens 1, as shown in FIG. 5, a condition $d/a = 1.0$ (where $2a$ is the diameter of the lens 3 in the surface of the base 2 and d is the thickness of the lens 3), i.e., the cross-section of the lens 3 is almost completely semicircular. When such a lens has a complete semicircular cross-section, it is believed to have best optical characteristics. In view of this, efforts have been made to date to obtain lenses having ideal semicircular cross-sections.

SUMMARY OF THE INVENTION

Inspite of the above, the present inventors have found the following fact through extensive studies and experiments. That is, in a plate microlens 1 with lenses having gradient index formed by ion diffusion, if the cross-section of each lens is close to an ideal semicircular shape, an aberration occurs to result in an error between a focal point 8A of a light beam 8 incident near the optical axis among the light beams which become incident on the lens 3 and a focal point 9A of a light beam 9 near the periphery of the lens 3. This results in a decrease in an effective numerical aperture range of a lens 3. When the cross-section of the lens 3 has a flatness within a predetermined range, the aberration is reduced and the effective numerical aperture of the lens 3 can be increased.

The present invention has been established based on the above finding. According to the present invention, when the cross-section is flat, the aberration is reduced and the effective numerical aperture of the lens is increased as compared to a lens having an almost semicircular cross-section.

BRIEF DESCRIPTION OF THE DRAWING

FIG. 12 is a graph showing the effective numerical aperture NAp as a function of the lens flatness d/a.

SPECIFIC DESCRIPTION OF THE INVENTION

The preferred embodiment of the present invention will now be described with reference to the accompanying drawings.

Figure 1:
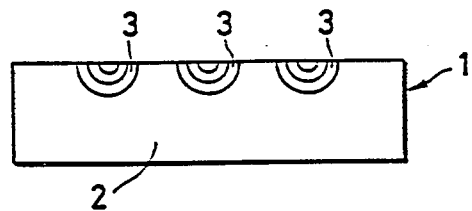
FIG. 1 is a sectional view showing a conventional plate microlens.
Figure 2:
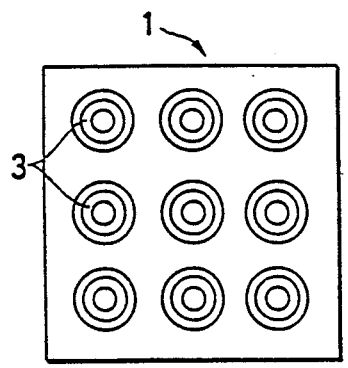
FIGS. 2 and 3 are top views showing the shapes of lenses in plate microlenses.
Figure 3:
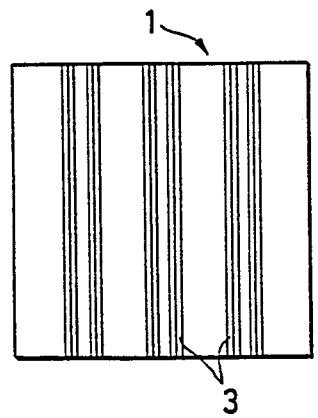
Figure 4:
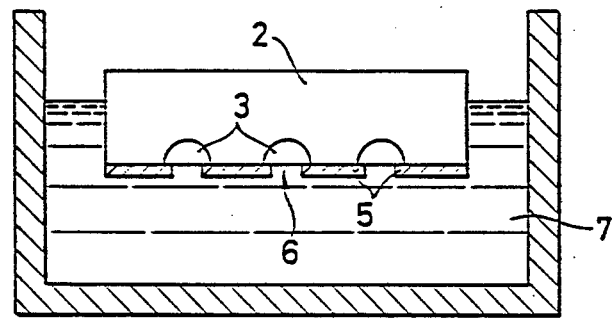
FIG. 4 is a sectional view showing an ion diffusion method.
Figure 5:
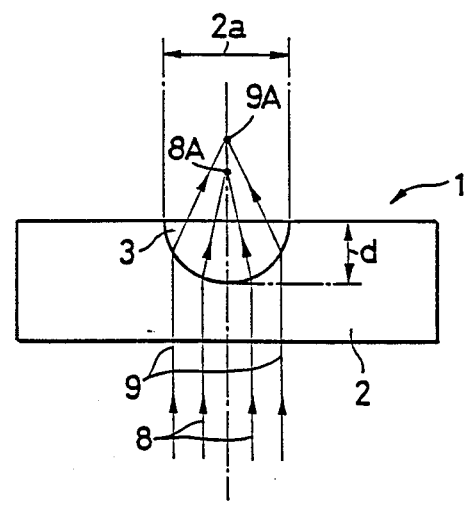
FIG. 5 is a sectional view for explaining the relationship between the lens diameter and thickness in a conventional plate microlens.
Figure 6:
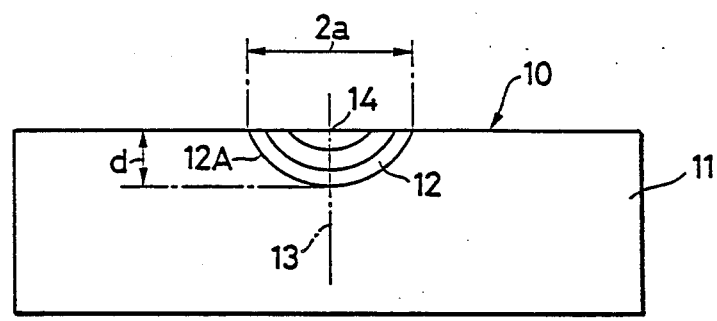
FIG. 6 is a sectional view showing a plate microlens according to an embodiment of the present invention.

FIG. 6 shows a sectional view of a plate microlens 10 according to the present invention. A gradient index lens 12 is formed integrally in a transparent glass base 11. The lens 12 has an optical axis 13 along a direction of a normal to the surface of the base 11. The refractive index profile of the lens 12 is such that the refractive index is maximum near an intersection 14 between the optical axis 13 and the surface of the base 11 and radially decreases toward deeper and peripheral portions of the lens 12.

The gradient index lens 12 is formed by the ion diffusion method described above. More specifically, cations such as Tl ions for increasing the refractive index of the base glass are exchanged with ions in the glass such as sodium or potassium ions through apertures formed in a mask on the surface of the glass base 11. Thus, the refractive index profile of the lens 12 is formed by the concentration profile of ions which have permeated into the glass.

When a cross-section of the plate microlens 10 manufactured in this manner is observed, a diffusion front 12A is observed. The diffusion front 12A is formed due to a relatively steep change in dopant concentration and is observed at a point at which the dopant concentration is reduced to several % of the saturation concentration in the glass base 11.

The diffusion front 12A, more generally, an edge 12A as a boundary line with the bulk portion of the base 11 is defined as the outer shape of the lens 12 within the base 11.

The optical characteristics of the plate microlens 10 having a gradient index defined by the dopant concentration in the glass are determined by the gradient index difference and the refractive index profile shape provided by the dopant.

In general, the numerical aperture defining a focusing power of a lens is increased with an increase in maximum refractive index difference provided by the dopant. However, when the profile shape is not proper, the aberration is increased, and the effective numerical aperture is reduced.

The maximum refractive index difference is substantially proportional to the dopant concentration in the glass. The refractive index profile is formed by ion-exchange in a ratio of about 1:1 of dopant ions to the ions of an alkali in the base glass. Therefore, the maximum refractive index difference is determined by the concentration of alkali ions exchanged in the glass base 11.

However, the amount of alkali ions which can be contained in a base glass is limited by the need for chemical stability of the glass and weatherability.

For this reason, in order to obtain a lens 12 having a large numerical aperture, the edge shape of a region having a gradient index must be appropriately determined. The present inventors have conducted experiments to determine an optimal shape of a region having the gradient index as described above in the plate microlens 10, i.e., to find out the relationship between the shape of the lens 12 and the effective numerical aperture. As a result of such experiments, the following facts were found: The effective numerical aperture of the lens 12 becomes maximum when d/a (where $2a$ is the diameter of the lens 12 and d is the thickness thereof) takes a specific value less than 1.0. The aberration of the lens 12 increases and the effective numerical aperture is reduced as the value of the ratio d/a increases or decreases from the specific value.

Figure 8:
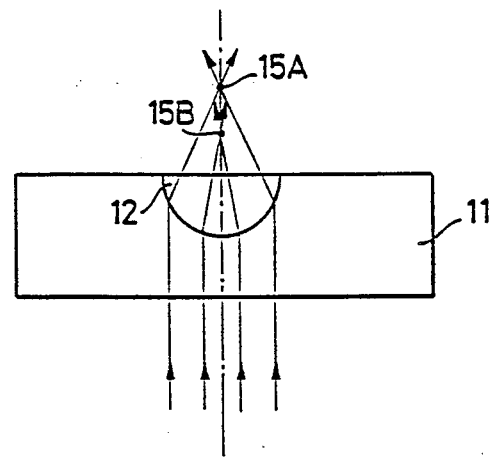
FIG. 8 is a sectional view showing the focusing state when the flatness of a lens cross-section is too small.

When the cross-sectional shape of the lens 12 finally obtained by prolonging the ion diffusion described above approaches a semicircular shape (d/a=1.0), as shown in FIG. 8, a positive spherical aberration occurs in which the position of a focal point 15A of a light beam incident near the periphery of the lens 12 is farther from the lens 12 than the position of a focal point 15B of a light beam near the optical axis. Then, the effective numerical aperture of the lens 12 is reduced.

Figure 7:
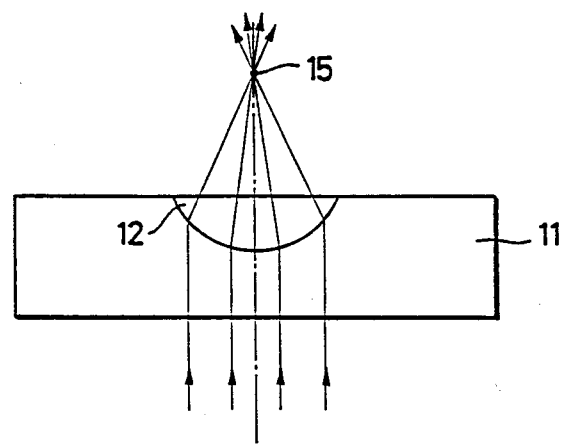
FIG. 7 is a sectional view showing a focusing function of the lens shown in FIG. 6.
Figure 9:
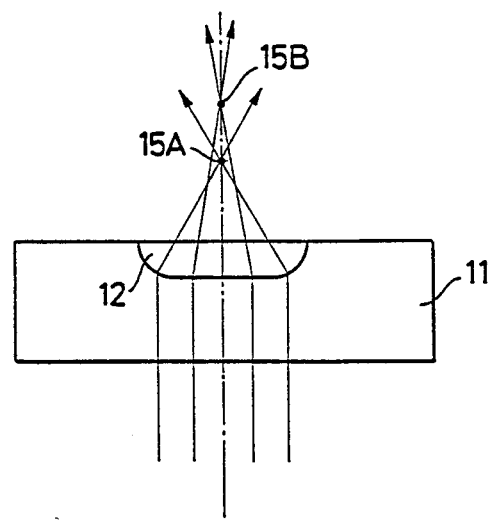
FIG. 9 is a sectional view showing the focusing state when the flatness of a lens is too large.

As the value of the ratio d/a is decreased, that is, as the flatness of the cross-sectional shape of the lens 12 increases, the aberration is decreased. However, as shown in FIG. 9, when the flatness increases too much, the light beam incident on peripheral portions having a larger curvature are bent at larger angles than light beams incident on flat central portions of the lens 12 inside the base 11. Then, a negative spherical aberration is increased, and the effective numerical aperture of the lens 12 is reduced again. In view of this, when the outer shape of the lens 12 inside the base 11 has a curved surface of a flatness having a value of a ratio d/a falling within a range of 0.46 to 0.78, the deviation of the position of the focal point 15 of the peripheral light beam with respect to the light beam on the optical axis is reduced as shown in FIG. 7, and a large effective numerical aperture of about 0.1 or more can be obtained. In particular, the ratio d/a preferably falls within a range of 0.5 to 0.69.

A method suitable for manufacturing a plate microlens according to the present invention will be described.

Figure 10:
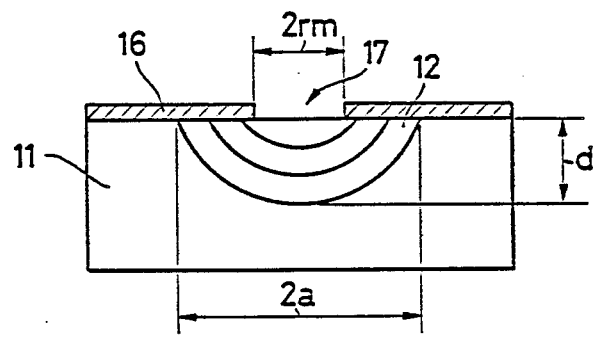
FIG. 10 is a sectional view for explaining the relationship between the mask aperture and lens diameter when a lens according to the present invention is manufactured.

As shown in FIG. 10, the surface of a base 11 such as a transparent glass plate is covered with an ion-permeation preventive mask 16 comprising a metal thin film or the like. Ion diffusion apertures 17 are formed in the mask 16 by a known patterning technique. The shape of the aperture 17 is selected to be similar to that of a lens 12 to be formed; a circular aperture 17 for a circular lens and a linear aperture 17 for a linear lens. Such apertures 17 are arrayed at predetermined intervals in accordance with the arrangement pattern of the lenses 12.

The size of the apertures 17 in the mask 16 is an important factor to consider. When the apertures 17 are too small, the cross-sectional shape of the lenses 12 obtained by ion diffusion becomes semicircular and the effective numerical aperture of the lens 12 is reduced. However, when the apertures 17 in the mask 16 are too large, the flatness of the cross-sectional shape of the lenses 12 obtained is increased and the effective numerical aperture is reduced again.

When the ratio a/rm is set to fall within a range of 1.75 to 4.5 (where rm is the radius of the aperture 17 of the mask 16 or the width in case of a linear aperture and a is the radius of a lens 12 to be obtained), a lens 12 having a small aberration with a value of the ratio d/a falling within a range of 0.46 to 0.78 and a large effective numerical aperture obtained. In particular, when the ratio a/rm is set to fall within a range of 1.9 to 3.3, a lens 12 having an effective numerical aperture of about 0.16 or more can be obtained.

The base 11 having the mask 16 with the apertures 17 having the size described above is subjected to ion diffusion. The ion diffusion can be performed by a conventional method. As an example, the surface of the base 11 having the mask 16 thereon is dipped in a molten salt such as a sulfate or a nitrate containing cations such as T1 ions. When the ion diffusion temperature is too low, the diffusion coefficient is small and it takes a long period of time to obtain a lens 12 having a desired size. However, when the diffusion temperature is too high, the base glass thermally deforms. Therefore, ion diffusion is preferably performed within a temperature range $\pm 50°$ C. of the glass transition temperature point (Tg).

In the above embodiment, glass is used for the base. However, the material of the base is not particularly limited, and quartz, ceramic, plastic and other suitable materials can be used. For example, when a plastic is used for a plate microlens, a monomer for forming a polymer having a relatively low refractive index is partially polymerized to obtain a gel-like base. The gel-like base is covered with a mask having apertures of a predetermined size. After a monomer for forming a polymer having a relatively high refractive index is diffused in the base, the base is heated to complete polymerization.

The present invention will now be described by way of its Examples.

EXAMPLE 1

Five bases were prepared. Each base had dimensions of 48 mm×48 mm×2 mm and consisted of a glass having a composition of 60 mol % of $SiO_2$, 4 mol % of $B_2O_3$, 15 mol % of ZnO, 8 mol % of $K_2O$, and 13 mol % of $Na_2O$.

After depositing 1 μm thick Ti films as an ion-permeation preventive masks on the surfaces of these glass bases by sputtering, 9 types of circular apertures having diameters changing in increments of 10 μm in a range of 20 to 100 μm were formed in the Ti films using a hydrofluoric acid etchant by photolithography. The mask sides of the glass bases were dipped in molten salts obtained by heating a mixture of 60 mol % of $Tl_2SO_4$ and 40 mol % of $ZnSO_4$ at 490° C. and were subjected to ion-exchange for 2 hours, 4 hours, 8 hours, 12.5 hours and 17 hours.

After the ion-exchange, the surfaces of the bases were polished to remove the Ti films and flattened. The characteristics of the gradient index lenses formed in the bases were measured.

The obtained results are shown in Tables 1 to 5 for each ion-exchange time.

TABLE 1

(Diffusion Time: 2 hrs)

| Mask Aperture Diameter 2rm (μm) | Lens Diameter 2a (μm) | Aperture Ratio a/rm | Flatness d/a | Focal Length f (μm) | NAf (a/f) | NAp |
|---|---|---|---|---|---|---|
| 100 | 171 | 1.70 | 0.41 | 1700 | 0.05 | 0.05 |
| 90 | 163 | 1.78 | 0.44 | 1100 | 0.07 | 0.06 |
| 80 | 149 | 1.88 | 0.47 | 620 | 0.12 | 0.11 |
| 70 | 140 | 2.0 | 0.50 | 389 | 0.18 | 0.17 |
| 60 | 132 | 2.17 | 0.54 | 324 | 0.2 | 0.19 |
| 50 | 114 | 2.28 | 0.56 | 283 | 0.2 | 0.19 |
| 40 | 104 | 2.60 | 0.62 | 274 | 0.19 | 0.18 |
| 30 | 94 | 3.13 | 0.68 | 313 | 0.15 | 0.14 |

TABLE 2

(Diffusion Time: 4 hrs)

| Mask Aperture Diameter 2rm (μm) | Lens Diameter 2a (μm) | Aperture Ratio a/rm | Flatness d/a | Focal Length f (μm) | NAf (a/f) | NAp |
|---|---|---|---|---|---|---|
| 100 | 215 | 2.15 | 0.53 | 620 | 0.17 | 0.18 |
| 90 | 207 | 2.30 | 0.57 | 555 | 0.19 | 0.19 |
| 80 | 195 | 2.44 | 0.59 | 511 | 0.19 | 0.20 |
| 70 | 184 | 2.63 | 0.62 | 460 | 0.20 | 0.19 |
| 60 | 171 | 2.85 | 0.65 | 425 | 0.20 | 0.18 |
| 50 | 160 | 3.20 | 0.69 | 385 | 0.21 | 0.16 |
| 40 | 144 | 3.60 | 0.72 | 377 | 0.19 | 0.12 |
| 30 | 121 | 4.03 | 0.75 | 372 | 0.16 | 0.10 |
| 20 | 102 | 5.10 | 0.80 | 365 | 0.14 | 0.07 |

TABLE 3

(Diffusion Time: 8 hrs)

| Mask Aperture Diameter 2rm (μm) | Lens Diameter 2a (μm) | Aperture Ratio a/rm | Flatness d/a | Focal Length f (μm) | NAf (a/f) | NAp |
|---|---|---|---|---|---|---|
| 100 | 232 | 2.32 | 0.57 | 567 | 0.21 | 0.21 |
| 90 | 221 | 2.46 | 0.59 | 563 | 0.20 | 0.20 |
| 80 | 207 | 2.59 | 0.61 | 498 | 0.21 | -0.18 |
| 70 | 195 | 2.79 | 0.64 | 487 | 0.20 | 0.15 |
| 60 | 184 | 3.07 | 0.67 | 416 | 0.22 | 0.15 |
| 50 | 173 | 3.46 | 0.71 | 341 | 0.25 | 0.13 |
| 40 | 157 | 3.93 | 0.75 | 290 | 0.27 | 0.10 |
| 30 | 137 | 4.57 | 0.78 | 237 | 0.29 | 0.10 |
| 20 | 106 | 5.30 | 0.81 | 291 | 0.18 | 0.06 |

TABLE 4

(Diffusion Time: 12.5 hrs)

| Mask Aperture Diameter 2rm (μm) | Lens Diameter 2a (μm) | Aperture Ratio a/rm | Flatness d/a | Focal Length f (μm) | NAf (a/f) | NAp |
|---|---|---|---|---|---|---|
| 100 | 278 | 2.78 | 0.64 | 559 | 0.25 | 0.18 |
| 90 | 253 | 2.81 | 0.64 | 497 | 0.25 | 0.16 |
| 80 | 243 | 3.04 | 0.67 | 486 | 0.25 | 0.16 |
| 70 | 230 | 3.29 | 0.70 | 439 | 0.26 | 0.16 |
| 60 | 210 | 3.50 | 0.71 | 421 | 0.25 | 0.15 |
| 50 | 200 | 4.0 | 0.75 | 374 | 0.27 | 0.13 |
| 40 | 185 | 4.63 | 0.78 | 355 | 0.26 | 0.12 |
| 30 | 171 | 5.70 | 0.82 | 353 | 0.24 | 0.12 |
| 20 | 67 | 3.35 | 0.70 | 367 | 0.11 | 0.11 |

TABLE 5

(Diffusion Time: 17 hrs)

| Mask Aperture Diameter 2rm (μm) | Lens Diameter 2a (μm) | Aperture Ratio a/rm | Flatness d/a | Focal Length f (μm) | NAf (a/f) | NAp |
|---|---|---|---|---|---|---|
| 100 | 303 | 3.03 | 0.67 | 650 | 0.23 | 0.17 |
| 90 | 280 | 3.11 | 0.68 | 561 | 0.25 | 0.15 |
| 80 | 270 | 3.44 | 0.71 | 505 | 0.27 | 0.15 |
| 70 | 258 | 3.69 | 0.73 | 450 | 0.29 | 0.15 |
| 60 | 242 | 4.03 | 0.75 | 429 | 0.28 | 0.13 |
| 50 | 210 | 4.20 | 0.76 | 392 | 0.27 | 0.13 |
| 40 | 210 | 5.25 | 0.81 | 370 | 0.28 | 0.12 |
| 30 | 184 | 6.13 | 0.84 | 516 | 0.18 | 0.16 |

In Tables 1 to 5, for the focal length f of the lens, the distance between the surface of the base and the position of a maximum brightness when a laser beam from an He-Ne laser having a wavelength of 633 nm was radiated onto the base side having no lens was measured.

NAf is a value obtained by dividing the lens radius by the focal length and represents the numerical aperture. However, this numerical aperture is not effective within all regions of the lens if the lens has an aberration.

Figure 11:
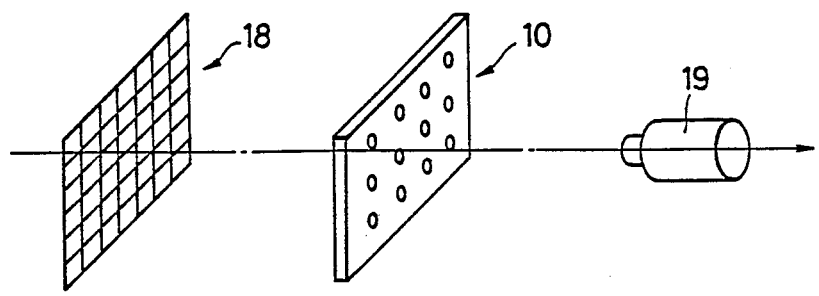
FIG. 11 is a perspective view showing a method of measuring the effective numerical aperture of a lens.
Figure 12:
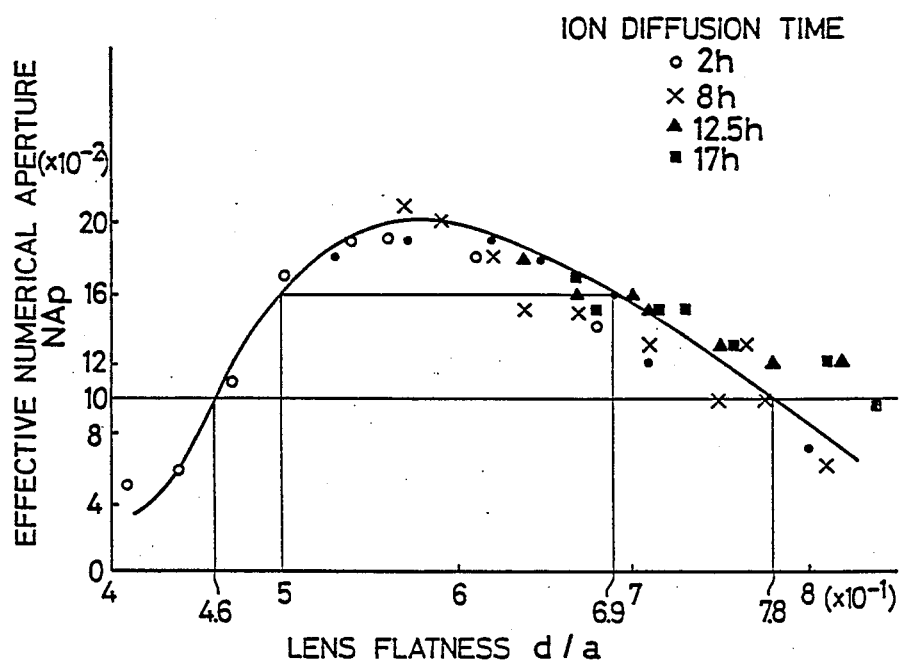

For this reason, as shown in FIG. 11, a grating pattern 18 having intervals of 2 mm was placed at a distance of 60 mm in front of a plate microlens 10. An image pattern formed by the lens 12 of the plate microlens 10 was observed with a 2.5×5 microscope 19. According to the observation results, when the lens 12 has an aberration, the regions of the lens 12 having the aberration do not contribute to imaging and the field angle is reduced. The sine (Sin) of the half angle of the field angle is shown as the effective numerical aperture NAp in Tables 1 to 5. FIG. 12 is a graph showing the effective numerical aperture NAp as a function of the flatness ratio d/a of the lens 12. It is seen from the graph in FIG. 12 that the effective numerical aperture of the plate microlens 10 is maximum when the flatness ratio d/a of the lens 12 is about 0.58. This is because the spherical aberration of the lens 12 changes from negative to positive and the aberration is minimum when the ratio d/a is about 0.58. It is also seen that an effective numerical aperture of 0.16 or more can be obtained when the ratio d/a is within a range of 0.5 to 0.69, and an effective numerical aperture of 0.1 or more can be obtained when the ratio is within a range of 0.46 to 0.78.

Figure 13:
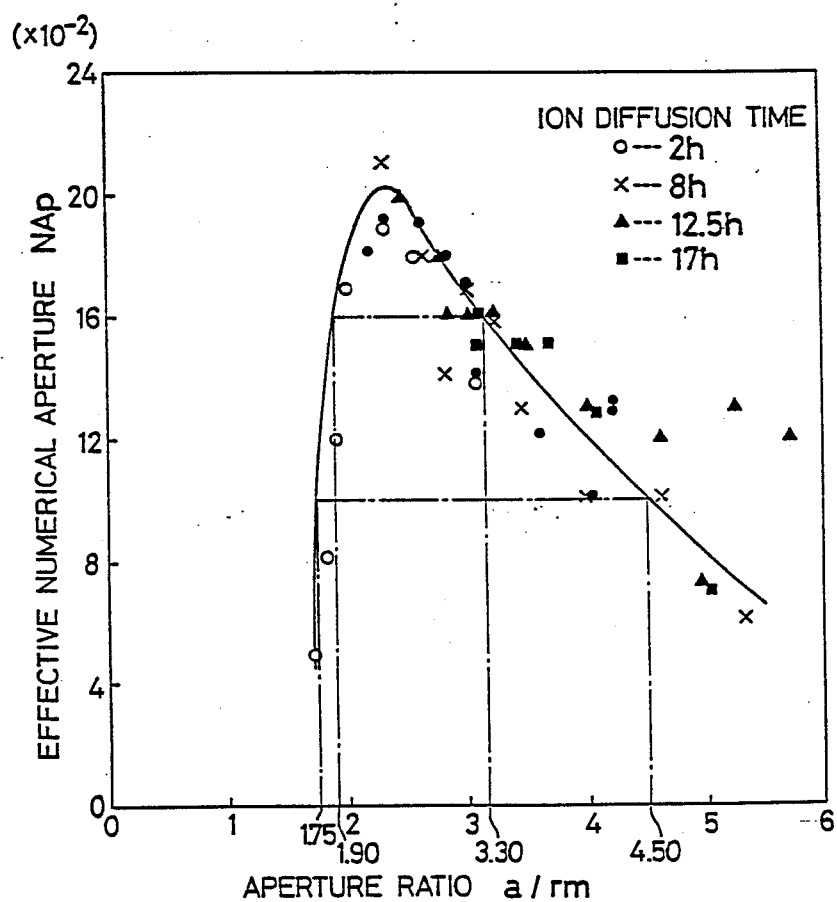
FIG. 13 is a graph showing the lens effective numerical aperture as a function of the ratio of the diameter of the mask aperture formed on a base surface during ion diffusion to the diameter of the obtained lens.

FIG. 13 shows the effective numerical aperture NAp of the lens 12 as a function of the aperture ratio of the mask 16. The ratio of a diameter 2a of the lens 12 to a diameter 2 rm of the aperture 17 of the mask 16 is plotted along the axis of abscissa. It is seen from this graph that an effective numerical aperture of about 0.1 or more is obtained when the ratio a/rm is within a range of 1.75 to 4.5 and an effective numerical aperture of about 0.16 or more can be obtained when the ratio a/rm is within a range of 1.9 to 3.3.

EXAMPLE 2

Three glass bases having the same composition as that in Example 1 were prepared. After Ti films were deposited on the surfaces of the bases as ion-permeation preventive films, apertures having a diameter of 400 μm were formed in the masks. The bases with the masks were dipped in a molten salt at 490° C. for 16 hours, 144 hours, and 576 hours to prepare plate microlenses.

For the respective diffusion times, the diameters 2a of the lenses formed in the bases were 0.6 mm, 0.9 mm and 1.6 mm, the thicknesses d of the lenses were 0.1 mm, 0.25 mm and 0.6 mm, the focal lengths were 2.5 mm, 2.25 mm and 6.7 mm, and the effective numerical apertures NAp observed by a grating pattern were 0.12, 0.2 and 0.12.

The flatness ratios d/a in the respective lenses were 0.33, 0.56 and 0.75, and the ratios a/rm of the lens radii a to the radii rm of the mask apertures were 1.5, 2.25 and 4.0.

It is seen from the above results that when the flatness ratio is about 0.56 for a lens having a diameter of about 0.9 mm, the aberration can be reduced and the NA can be maximized.

into molds at 1,000° C. to 1,250° C. and gradually cooled to obtain glasses shown in Table 6.

The glass plates prepared in this manner were cut into square bases having a side of 50 mm and polished to a thickness of 5 mm. Ti films were formed as ion-permeation preventive films on one side each of the bases. Circular apertures were formed in the Ti films by a conventional photolithography method. The diameter of the apertures was about 100 μm in the case of Example 3. The glass bases with the mask films were dipped in a molten salt of a mixture consisting of 60 mol % of thallium sulfate ($Tl_2SO_4$) and 40 mol % of zinc sulfate ($ZnSO_4$) to perform ion-exchange. The temperature of the molten salt was set to be about 10° C. higher than the glass transition point of each glass in Table 6.

As a Control, a base of BK-7 optical glass conventionally used as a base glass of a plate microlens was prepared and was subjected to the ion-exchange as described above. In the ion-exchange process, in Examples 3, 6 and 7 and Control, a DC electric field of about 30 V was applied between the two surfaces of each base, and no electric field was applied in other Examples.

After the ion-exchange, the masks on the surfaces of the bases were removed, and the diameters and numerical apertures (NA) of the gradient index lenses formed in the bases were measured. The obtained results are shown in the lower half of Table 6.

TABLE 6

(Unit: mol %)

| Composition | Example | | | | | | Control (BK-7) |
|---|---|---|---|---|---|---|---|
| | 3 | 4 | 5 | 6 | 7 | 8 | |
| $SiO_2$ | 60 | 60 | 60 | 74 | 66 | 65 | 75.0 |
| $B_2O_3$ | 4 | 4 | | | 8 | | 10.2 |
| ZnO | 10 | 14 | 14 | | | | |
| $K_2O$ | 10 | 8 | 10 | 5 | 3 | 8 | 4.8 |
| $Na_2O$ | 15 | 13 | 15 | 9 | 11 | 20 | 9.6 |
| $ZrO_2$ | 1 | 1 | 1 | | | | |
| CaO | | | | 8 | | | |
| BaO | | | | 1 | | | 0.5 |
| MgO | | | | | 9 | | |
| $Al_2O_3$ | | | | | 2 | 7 | |
| Melting Point | 1250 | 1300 | 1250 | 1450 | 1450 | 1550 | 1450 |
| Transition Point | 472 | 490 | 462 | 550 | 542 | 520 | 555 |
| Refractive Index | 1.5296 | 1.5403 | 1.5369 | 1.520 | 1.513 | 1.511 | 1.52 |
| Lens Diameter (mm) | 0.6 | 0.2 | 2.5 | 0.9 | 0.8 | 2.6 | 0.8 |
| Numerical Aperture (NA) | 0.32 | 0.20 | 0.35 | 0.2 | 0.18 | 0.36 | 0.13 |
| Ion-Exchange Time | 6 hours | 2 hours | 2 days | 6 hours | 6 hours | 2 days | 6 hours |
| Diffusion Condition | Electric field applied | No electric field applied | No electric field applied | Electric field applied | Electric field applied | No electric field applied | Electric field applied |

EXAMPLES 3–8

In Examples, glass bases having the compositions shown in Table 6 were prepared. As the raw materials for the respective compositions, silica powder, boric acid, zinc oxide, potassium carbonate, sodium carbonate, zirconia, aluminum hydroxide, antimony oxide, and arsenous anhydride were used. These materials were mixed in predetermined amounts, and the resultant mixtures were charged in Pt crucibles. The crucibles were placed in electric furnaces heated to 1,250° C. to 1,500° C. to melt the materials. After the materials were stirred well to obtain homogeneous glasses, they were charged The plate microlenses in Examples 3 to 8 had no devitrified or corroded regions on the glass surfaces and were highly transparent. In contrast to this, the BK-7 glass in the Control had a thin turbid layer by corrosion of the glass surface by the molten salt.

As can be seen from a comparison of Example 7 and the Control each of which has same lens diameter, the plate microlenses using glasses of Examples 3 to 8 as bases can provide sufficiently large numerical apertures even if the lenses have very small diameters of 1 mm or less.

The respective components of the glass compositions of Examples 3 to 8 will be described in detail. $SiO_2$ is a basic component of the glass. When the $SiO_2$ content is less than 45%, the durability and stability of the glass is reduced. When the $SiO_2$ content exceeds 80%, the melting point of the glass is increased, the required amounts of other component cannot be added, and lenses having a large refractive index difference cannot be obtained. Therefore, the $SiO_2$ content must fall within a range of 45 to 80% and preferably within a range of 55 to 75%.

$B_2O_3$ allows easy melting of the glass. However, when $B_2O_3$ is added in too large an amount, cords may be formed by evaporation and lens deformation may be caused upon ion-exchange. Therefore, the $B_2O_3$ content must be kept within a range of 0 to 8%.

ZnO widens the vitrification temperature range, lowers the melting point, improves devitrification resistance and durability, and has a smaller effect of reducing an ion-exchange speed than other modified oxides having a valency of 2. When the ZnO content is less than 2%, the devitrification resistance and durability of the glass are poor. When the ZnO content exceeds 20%, the durability of the glass becomes poor again. Therefore, the ZnO content must fall within a range of 2 to 20% and preferably within a range of 5 to 15%.

$ZrO_2$ has a significant effect of improving weatherability of the glass. However, when the $ZrO_2$ content exceeds 2%, the glass becomes difficult to melt. Therefore, the $ZrO_2$ content must be 0 to 2%.

$Al_2O_3$ serves to improve weatherability of the glass and resistance to a molten salt in the ion-exchange process as in the case of $ZrO_2$. When $Al_2O_3$ content exceeds 7%, the melting performance of the glass is impaired. Therefore, the $Al_2O_3$ content must fall within a range of 0 to 7% and preferably within a range of 0 to 5%.

CaO, MgO and BaO widen the vitrification temperature range of the glass and improve the weatherability of the glass. These components can be added in a total amount of 0 to 10%.

In Examples 3 to 8, the most important glass component is an oxide of an alkali metal having a valency of 1 (to be referred to as $R_2O$ hereinafter). As described above, in a method of manufacturing a plate microlens by ion-exchange, ions having a valency of 1 and a relatively low electron polarization ratio contained in the base glass, and ions having a high electron polarization ratio such as Tl or Ag ions are partially exhanged to form a gradient index profile at such partially ion-exchanged region. $R_2O$ serves as ion-exchange ions. When the $R_2O$ content is less than 8%, the angular aperture ($\theta$) of the lens is reduced to an impractical degree. However, when the $R_2O$ content exceeds 35%, the durability of the glass is abruptly decreased. Therefore, a total $R_2O$ content must be within a range of 8 to 35% and preferably within a range of 12 to 28%. R is preferably Li or Na so as to increase the maximum refractive index difference $\Delta n$ of the lens. Considering the stress on the glass structure upon exchange with Tl ions having a large ion radius, K and Cs are preferable. Therefore, the glass composition for the base of a plate microlens preferably contains at least one of Li and Na and at lease one of K and Cs in a total amount falling within the above-mentioned range.

As the glass compositions of Examples 3 to 8, one or more of SrO, PbO, $TiO_2$ and $La_2O_3$ can be added in addition to the above components in a total amount of 8% or less. These components can widen the vitrification temperature range and improve melting performance of the glass. When these components are added exceeding the above-mentioned range, ion-exchange cannot be performed smoothly.

The glasses of Examples 3 to 8 can further contain 0.5% or less of $Sb_2O_3$ or $As_2O_3$ as a clarifier when melting the glass.

According to the present invention, plate microlenses having a small aberration and a large effective numerical aperture can be obtained.

The plate microlenses according to the present invention are useful in a wide variety of applications such as normal image transmission, optical beam focusing and collimating optical systems.

What is claimed is:

1. A plate microlens comprising gradient index lenses formed integrally in a transparent base, each of said gradient index lenses having an optical axis along a normal to a surface of said transparent base and each having a refractive index profile gradually changing along a direction of the optical axis and along a direction perpendicular thereto, each of said gradient index lenses having a ratio d/a of 0.5 to 0.69, where d is the thickness of the gradient index lens along the optical axis and 2a is the diameter of the gradient index lens along said surface of said transparent base, and each gradient index lens having an effective numerical aperture of at least 0.1, said base consisting essentially of a glass having the following composition: $SiO_2$ of 45 to 80 mol %, an oxide of an alkali metal of 8 to 35 mol %, ZnO of 2 to 20mol %, $B_2O_3$ of 0 to 8 mol %, $Al_2O_3$ of 0 to 7 mol %, $ZrO_2$ of 0 to 2 mol %, and CaO =BaO=MgO of 0 to 10 mol %.

* * * * *